United States Patent
Ostermeier

(10) Patent No.: US 10,894,461 B2
(45) Date of Patent: Jan. 19, 2021

(54) METHOD AND CONTROL UNIT FOR CONTROLLING AN AIR CONDITIONING SYSTEM

(71) Applicant: Bayerische Motoren Werke Aktiengesellschaft, Munich (DE)

(72) Inventor: Ralph Ostermeier, Wolfersdorf (DE)

(73) Assignee: Bayerische Motoren Werke Aktiengesellschaft, Munich (DE)

( * ) Notice: Subject to any disclaimer, the term of this patent is extended or adjusted under 35 U.S.C. 154(b) by 217 days.

(21) Appl. No.: 15/813,256

(22) Filed: Nov. 15, 2017

(65) Prior Publication Data

US 2018/0170151 A1 Jun. 21, 2018

(30) Foreign Application Priority Data

Dec. 21, 2016 (DE) ........................ 10 2016 225 723

(51) Int. Cl.
*B60H 1/00* (2006.01)
(52) U.S. Cl.
CPC ....... *B60H 1/00828* (2013.01); *B60H 1/0073* (2019.05); *B60H 1/00964* (2013.01); *B60H 2001/006* (2013.01)
(58) Field of Classification Search
None
See application file for complete search history.

(56) References Cited

U.S. PATENT DOCUMENTS

| 4,498,309 A * | 2/1985 | Kobayashi | B60H 1/00828 165/43 |
| 5,078,316 A * | 1/1992 | Hara | B60H 1/00964 236/49.3 |
| 5,511,724 A * | 4/1996 | Freiberger | G05D 23/1917 236/49.3 |
| 5,704,217 A * | 1/1998 | Itoh | B60H 1/3207 62/150 |
| 5,931,378 A * | 8/1999 | Schramm | B60H 1/00964 236/94 |
| 6,076,593 A * | 6/2000 | Takagi | B60H 1/00914 165/201 |

(Continued)

FOREIGN PATENT DOCUMENTS

| DE | 20 2014 100 012 U1 | 5/2014 |
| JP | 2003-148144 A | 5/2003 |

OTHER PUBLICATIONS

German-language Search Report issued in counterpart German Application No. 10 2016 225 723.4 dated Jul. 19, 2017 with partial English translation (Twelve (12) pages).

Primary Examiner — Avinash A Savani
Assistant Examiner — Martha M Becton
(74) Attorney, Agent, or Firm — Crowell & Moring LLP

(57) ABSTRACT

A control unit for an air conditioning system of a vehicle is provided, wherein the air conditioning system has automatic climate control. The control unit is configured to calculate a fan strength limitation specified by a user. The control unit is further configured to activate the fan of the air conditioning system for automatic climate control depending on a fan characteristic curve and depending on the fan strength limitation, wherein the fan characteristic curve displays a fan strength for a fan of the air conditioning system as a function of a control deviation of the automatic climate control.

10 Claims, 2 Drawing Sheets

(56) References Cited

U.S. PATENT DOCUMENTS

| | | | | |
|---|---|---|---|---|
| 6,275,231 B1* | 8/2001 | Obradovich | B60R 16/0231 | 345/156 |
| 6,651,895 B1* | 11/2003 | Kadle | B60H 1/00971 | 236/49.3 |
| 6,669,101 B2* | 12/2003 | Ichishi | B60H 1/00735 | 236/49.3 |
| 6,698,663 B2* | 3/2004 | Wang | B60H 1/00735 | 236/49.3 |
| 6,712,133 B1* | 3/2004 | Kyrtsos | B60H 1/00735 | 165/239 |
| 6,744,374 B1* | 6/2004 | Kuenzner | B60H 1/00985 | 340/815.78 |
| 7,123,972 B2* | 10/2006 | Lee | B60H 1/0065 | 700/36 |
| 7,246,656 B2* | 7/2007 | Ichishi | B60H 1/00792 | 165/202 |
| 7,346,440 B2* | 3/2008 | Ichishi | B60H 1/00735 | 237/2 A |
| 7,414,206 B2* | 8/2008 | Kikuya | B60H 1/0065 | 200/11 R |
| 8,260,495 B2* | 9/2012 | Pfau | B60H 1/00764 | 381/71.4 |
| 8,567,687 B2* | 10/2013 | Schneider | B60H 1/00985 | 165/204 |
| 9,120,365 B2* | 9/2015 | Herr-Rathke | B60H 1/00964 | |
| 9,428,035 B2* | 8/2016 | Eisenhour | B60H 1/0075 | |
| 9,487,060 B2* | 11/2016 | Choi | B60H 1/00757 | |
| 9,533,549 B2* | 1/2017 | Rose | B60H 1/00735 | |
| 9,555,689 B2* | 1/2017 | Sebastian | B60H 1/00971 | |
| 9,821,633 B2* | 11/2017 | Minami | B60H 1/00964 | |
| 10,372,092 B2* | 8/2019 | Coleman | | |
| 2003/0066297 A1* | 4/2003 | Ichishi | B60H 1/00735 | 62/161 |
| 2003/0146290 A1* | 8/2003 | Wang | F24F 11/30 | 236/49.3 |
| 2004/0089005 A1* | 5/2004 | Ichishi | B60H 1/00985 | 62/214 |
| 2005/0004728 A1* | 1/2005 | Lee | B60H 1/0065 | 701/36 |
| 2006/0163045 A1* | 7/2006 | Kikuya | B60H 1/0065 | 200/56 R |
| 2007/0137850 A1* | 6/2007 | Straub | B60H 1/00735 | 165/202 |
| 2008/0147270 A1* | 6/2008 | Sakane | B60H 1/00792 | 701/36 |
| 2009/0071393 A1* | 3/2009 | Takenaka | G01D 13/10 | 116/291 |
| 2010/0028134 A1* | 2/2010 | Slapak | F24F 13/24 | 415/119 |
| 2010/0050671 A1* | 3/2010 | Kahn | B60H 1/00378 | 62/190 |
| 2011/0010015 A1* | 1/2011 | Jordan | B60H 1/0073 | 700/280 |
| 2011/0088887 A1* | 4/2011 | Schneider | B60H 1/00964 | 165/202 |
| 2014/0034266 A1* | 2/2014 | Tabei | B60H 1/00842 | 165/42 |
| 2014/0190678 A1 | 7/2014 | Dage et al. | | |
| 2015/0093981 A1* | 4/2015 | Fusco | B60H 1/00742 | 454/75 |
| 2015/0158368 A1* | 6/2015 | Herr-Rathke | B60H 1/00964 | 701/2 |
| 2015/0217626 A1* | 8/2015 | Minami | B60H 1/00964 | 165/202 |
| 2015/0224848 A1* | 8/2015 | Eisenhour | B60H 1/0075 | 62/186 |
| 2015/0231947 A1* | 8/2015 | Shmueli-Friedland | B60H 1/00742 | 165/202 |
| 2015/0239322 A1* | 8/2015 | Yokoo | B60H 1/00907 | 62/158 |
| 2015/0283878 A1* | 10/2015 | Rose | B60H 1/00735 | 701/36 |
| 2016/0114653 A1* | 4/2016 | Horn | B60H 1/00735 | 165/202 |
| 2018/0312037 A1* | 11/2018 | Uesugi | B60H 1/3208 | |

* cited by examiner

METHOD AND CONTROL UNIT FOR CONTROLLING AN AIR CONDITIONING SYSTEM

CROSS REFERENCE TO RELATED APPLICATIONS

This application claims priority under 35 U.S.C. § 119 from German Patent Application No. 10 2016 225 723.4, filed Dec. 21, 2016, the entire disclosure of which is herein expressly incorporated by reference.

BACKGROUND AND SUMMARY OF THE INVENTION

The invention relates to a method and a corresponding control unit for controlling an air conditioning system, particularly an automatic air conditioning unit, in a vehicle.

A vehicle typically has an air conditioning system which makes it possible for example to set the temperature in the interior of the vehicle to a certain target temperature. In this context, setting to a target temperature may be carried out automatically by a control algorithm of the air conditioning system. In particular, relatively warm or relatively cool air may be blown into the interior of the vehicle by a fan to adjust the temperature in the interior of the vehicle. In the case of a relatively high fan strength during this process, a relatively high noise burden may be created by the fan in the interior of the vehicle.

The present document addresses the technical problem of efficiently enabling a user of a vehicle to increase the comfort of an automatic air conditioning unit of the vehicle, in particular to reduce the noise burden of an automatic air conditioning unit of the vehicle.

The problem is solved by a control unit and control method according to embodiments of the invention.

According to one aspect, a control unit for an air conditioning system of a vehicle (particularly, a two-track road vehicle) is described. The air conditioning system includes automatic climate control. This enables one or more climate parameters (e.g. temperature, atmospheric humidity, etc.) to be adjusted to respective target values within the limits of the automatic climate control. To this end, a control deviation may be determined as part of the automatic climate control, showing the degree to which the one or more climate parameters differ from the respective target values. Then, one or more components of the air conditioning system, particularly a heating or cooling unit and/or one or more fans, may be activated depending on the control deviation in order to set the one or more climate parameters to the respective target values. For example, a heating unit may be activated to heat air, which is then directed into the interior of the vehicle via at least one fan if the actual temperature in the interior of the vehicle is below a target temperature (specified by a user, for example). If an actual temperature is too high, a cooling unit may be activated instead to cool air. The at least one fan may be operated at different fan strengths (in particular with different discrete fan levels) to change the quantity of required, heated or cooled, air.

The control unit may be configured to determine a fan characteristic curve and/or fan strength to be used for automatic climate control. The fan strength may be determined in this case by accessing a predefined fan characteristic curve stored on a storage unit of the vehicle. In particular, the control unit may be configured to capture an input for specifying a fan characteristic curve entered by a user via a user interface of the air conditioning system. For example, the user interface may serve to enable a user to select a fan characteristic curve from a plurality of predefined fan characteristic curves (e.g., indirectly by selecting a certain operating mode for automatic climate control from a plurality of possible operating modes; the different operating modes may then be linked to different predefined fan characteristic curves, so that a certain fan characteristic curve is specified by the selection of a certain operating mode). In this context, the different fan characteristic curves may particularly differ in the intensity of the use of relatively high fan strengths (to enable a more or less rapid adjustment of the one or more climate parameters).

The fan characteristic curve displays a fan strength for a fan of the air conditioning system as a function of a control deviation of the automatic climate control. A fan characteristic curve is typically designed so that the fan strength increases as the absolute value of the control deviation increases (for example up to a maximum technically possible fan strength). In this context, the maximum technically possible fan strength may be used for control deviations of varying magnitudes for different fan characteristic curves.

Information relating to the actual temperature in the interior of the vehicle may be calculated as part of the automatic climate control, for example via a climate sensor of the air conditioning system. Information relating to a target temperature in the interior of the vehicle (which was specified for example by a user of the vehicle via the user interface) may also be calculated. Then, a current control deviation may be calculated for the automatic climate control on the basis of the information relating to the actual temperature and on the basis of the information relating to the target temperature. The fan characteristic curve then makes it possible to calculate a current fan strength for the fan for the current control deviation.

The control unit is further configured to calculate a fan strength limitation specified by a user. The fan strength limitation may in this case particularly include a maximum fan strength (as desired by a user) and/or a minimum fan strength (as desired by a user). The control unit may be configured to capture an input for specifying a value for the maximum fan strength and/or for the minimum fan strength entered by a user via a user interface of the air conditioning system. The specification of the maximum and/or minimum fan strength may thereby be carried out independently of the specification of a fan characteristic curve. In particular, a maximum and/or minimum fan strength may be specified by the user which applies for all possible fan characteristic curves of the air conditioning system and can be specified explicitly by a user. In this context, the maximum fan strength may be less than the maximum technically possible fan strength (which is used in a fan characteristic curve).

The control unit is further configured to activate the fan of the air conditioning system for automatic climate control depending on the fan characteristic curve and depending on the fan strength limitation. In particular, a current fan strength may be calculated for operating the fan as part of the automatic climate control depending on the fan characteristic curve and depending on the fan strength limitation.

In this way, it is made possible for a user to explicitly specify a maximum and/or a minimum fan strength with which a fan is operated during automatic climate control. This makes it possible for a user to efficiently and reliably limit the noise burden in the interior of the vehicle when an automatic air conditioning unit is used. Consequently, the comfort of the passengers in the vehicle is enhanced.

The control unit may particularly be configured to limit the fan strength for the fan that is used for automatic climate control to the maximum fan strength. In this way, it is possible to reliably limit the noise that is generated when an automatic air conditioning unit is in operation, i.e. when automatic climate control is being carried out.

The control unit may be configured to calculate a current control deviation of the automatic climate control. Then, a provisional (current) fan strength may be calculated on the basis of the fan characteristic curve and on the basis of the current control deviation. Additionally, a final (current) fan strength may be calculated for the fan during automatic climate control on the basis of the provisional (current) fan strength and on the basis of the fan strength limitation. In particular, the maximum fan strength (specified by a user) may be compared with the provisional (current) fan strength and the final (current) fan strength may be calculated depending on the comparison. In this context, the final (current) fan strength may correspond to the maximum fan strength (specified by the user) if the provisional fan strength is greater than the maximum fan strength. In this way, the noise that is generated when an automatic air conditioning unit is operating may be reliably limited.

According to a further aspect, a method for controlling a fan of an air conditioning system of a vehicle is described, wherein the air conditioning system includes automatic climate control. The method may comprise calculation of a fan characteristic curve. In this context, a certain predefined fan characteristic curve from a storage unit of the vehicle is typically used. The calculation of the fan characteristic curve may thus correspond to the readout of a predefined fan characteristic curve from a storage unit of the vehicle. The fan characteristic curve thereby displays a fan strength for the fan as a function of a control deviation of the automatic climate control. The method further comprises the calculation of a fan strength limitation specified by a user. The method also comprises the control of the fan for automatic climate control depending on the fan characteristic curve and depending on the fan strength limitation.

According to a further aspect, a vehicle is described (particularly a road vehicle, for example a car, a truck or a motorcycle) that includes the control unit and/or the air conditioning system described in this document.

According to a further aspect, a software (SW) program is described. The SW program may be configured to be executed on a processor, and thus to carry out the method described in this document.

According to a further aspect, a storage medium is described. The storage medium may include a SW program which is configured to be executed on a processor, and thus to carry out the method described in this document.

It should be noted that the methods, devices and systems described in this document may be used either alone or in combination with other methods, devices and systems described in this document. Moreover, any aspects of the methods, devices and systems described in this document may be combined with each other in a very wide variety of ways. In particular, the features of the claims may be combined with each other in a very wide variety of ways.

Other objects, advantages and novel features of the present invention will become apparent from the following detailed description of one or more preferred embodiments when considered in conjunction with the accompanying drawings.

DETAILED DESCRIPTION OF THE DRAWINGS

Figure 1:
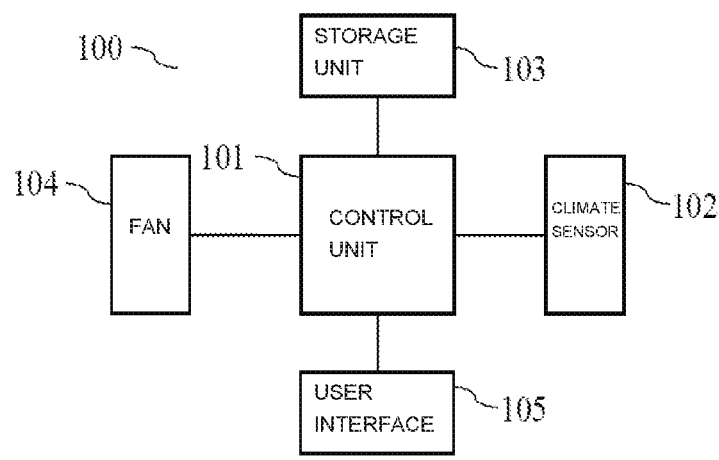
FIG. 1 represents exemplary components of a vehicle.

As was noted in the introduction, the present document addresses the technical problem of reducing the noise burden of an automatic air conditioning unit of a vehicle. In this context, FIG. 1 represents exemplary components of a vehicle 100. Vehicle 100 includes at least one climate sensor 102 (particularly a temperature sensor) which is configured to record sensor data relating to the value of a climate parameter in the interior of vehicle 100 (e.g. relating to the actual temperature in the interior of vehicle 100). Vehicle 100 also includes a user interface 105 which enables a user of vehicle 100 to specify a target value for a climate parameter (particularly a target temperature) for the interior of vehicle 100. User interface 105 may include for example a touch-sensitive screen and/or a rotate and press button with which an input of a user may be entered.

Figure 2:
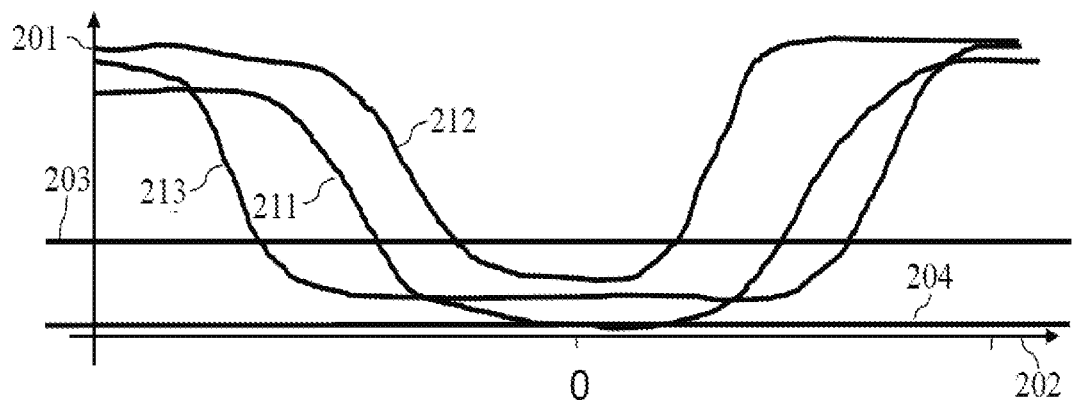
FIG. 2 represents exemplary characteristic curves for the activation of a fan of a vehicle.

Vehicle 100 further has a storage unit 103, in which one or more fan characteristic curves 211, 212, 213 for a fan 104 of vehicle 100 may be stored (see FIG. 2). A fan characteristic curve 211, 212, 213 may display a fan strength 201 for fan 104 of vehicle 100 as a function of a control deviation 202 of a climate controller of vehicle 100. Control deviation 202 may depend for example on a difference between the actual temperature and the target temperature in the interior of vehicle 100. The control deviation may in this case be positive, for example, if the actual temperature is higher than the target temperature (and therefore relatively cool air is to be blown into the interior of vehicle 100 by fan 104). On the other hand, the control deviation may be negative if the actual temperature is lower than the target temperature (and therefore relatively warm air is to be blown into the interior of vehicle 100 by fan 104).

As is represented in FIG. 2, fan characteristic curves 211, 212, 213 are typically designed such that the fan strength 201 to be used increases as the magnitude of control deviation 202 increases. In this way, it may be assured that the actual temperature is adjusted to the target temperature more quickly. In this process, particularly the use of relatively high fan strengths 201 may vary for different characteristic curves 211, 212, 213. For example, relatively high fan strengths 201 are used with characteristic curve 212 even for quantitatively small control deviations 202, in order to reach the target temperature as quickly and stably as possible. In contrast, with characteristic curve 213 relatively high fan strengths 201 are only used for quantitatively relatively large control deviations 202. Consequently, when characteristic curve 213 is used, the target temperature is reached relatively slowly, and relatively large deviations between the actual temperature and the target temperature may arise.

Multiple different fan characteristic curves 211, 212, 213 may be provided and selected by a user via user interface 105 in a vehicle 100.

Vehicle 100 includes a control unit 101 which is configured to calculate the fan strength 201 of fan 104 of vehicle 100 depending on a fan characteristic curve 211, 212, 213, depending on the sensor data of climate sensor 102 (particularly depending on the actual temperature), and depending on the specified target temperature. In particular, fan strength 201 of fan 104 may be controlled as part of an automatic air conditioning unit.

At the beginning of a journey, relatively large deviations may exist between the actual temperature in the interior of vehicle 100 and the desired target temperature. Consequently, relatively high fan strengths 201 may be selected and used by control unit 101 in the context of the automatic air conditioning unit. This may result in an unpleasant noise burden for a passenger in vehicle 100. In particular, it may cause a passenger in vehicle 100 to feel uncomfortable and consequently deactivate the automatic air conditioning unit and set a fixed fan strength 201 manually (thus no longer benefiting from the advantages of an automatic air conditioning unit).

Figure 3:
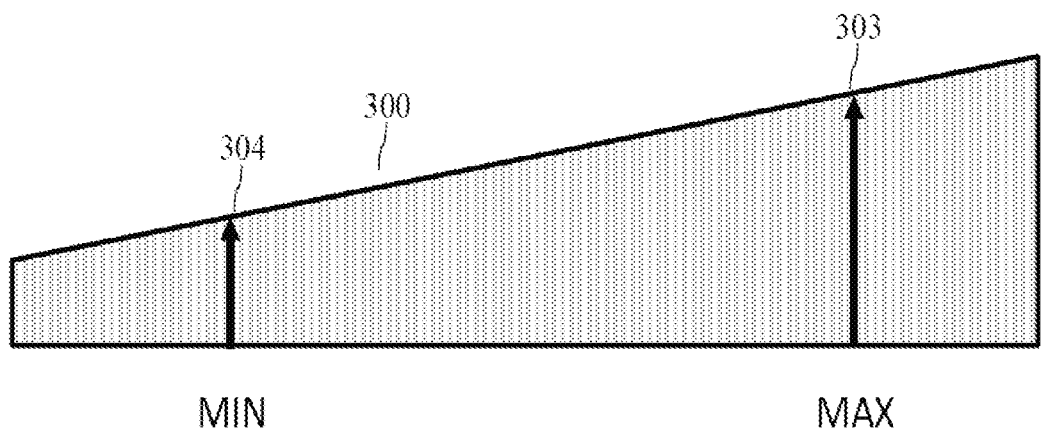
FIG. 3 represents an exemplary user interface for specifying a fan strength limitation.

With user interface 105 of vehicle 100, a user may be enabled to explicitly set a maximum fan strength 203 and optionally a minimum fan strength 204, which are to be used as part of the automatic air conditioning unit (optionally for all possible fan characteristic curves 211, 212, 213). For example, the entire spectrum 300 of possible fan strengths 201, from a deactivated fan 104 to a maximum technically possible fan strength may be displayed on a screen (see FIG. 3). It may then be made possible for the user for example to shift a bar 303, 304 along spectrum 300 to specify the maximum fan strength 203 (or to specify the minimum fan strength 204 in similar manner). The entry for such may be made directly via a touch-sensitive screen and/or via a twist and push button.

The maximum and/or minimum fan strengths 203, 204 specified by the user may then be taken into account by control unit 101 when determining the fan strength 201 that is to be used as part of an automatic air conditioning unit. In particular, a control deviation 202 may be calculated on the basis of the sensor data of sensor 102 and on the basis of the specified target temperature. A provisional fan strength 201 may further be calculated on the basis of control deviation 202 and the specified fan characteristic curve 211, 212, 213. The provisional fan strength 201 may then be adjusted depending on the maximum or minimum fan strength 203, 204. In particular, the maximum fan strength 203 may be used as the final fan strength 201 if the provisional fan strength 201 is greater than the maximum fan strength 203. The provisional fan strength 201 from fan characteristic curve 211, 212, 213 may further be used as the final fan strength 201 if the provisional fan strength 201 is lower than the maximum fan strength 203 and optionally higher than the minimum fan strength 204. The minimum fan strength 204 may further be optionally used as the final fan strength 201 if the provisional fan strength 201 is lower than the minimum fan strength 204.

Thus, a current control deviation 202 and a final (current) fan strength 201 may be calculated repeatedly (particularly periodically, e.g. with a frequency of 1 Hz or more) during automatic climate control to adjust the one or more climate parameters in the interior of vehicle 100 to the respective target values. By specifying a maximum fan strength 203, it may thus be reliably made possible for a user to limit the noise burden of a fan 104 when an automatic air conditioning unit is in use.

Accordingly, a variable upper limit 203 and/or lower limit 204 of the fan strength 201 (particularly of the fan stage) may be implemented by a user, which limits may be preselected in an automation program of an air conditioning system of a vehicle 100. The specification of a limit 203, 204 may then be made by choosing a limit, e.g., with a soft slider on a touchscreen display. Alternatively or additionally, the specification may be made via a rotary controller.

Figure 4:
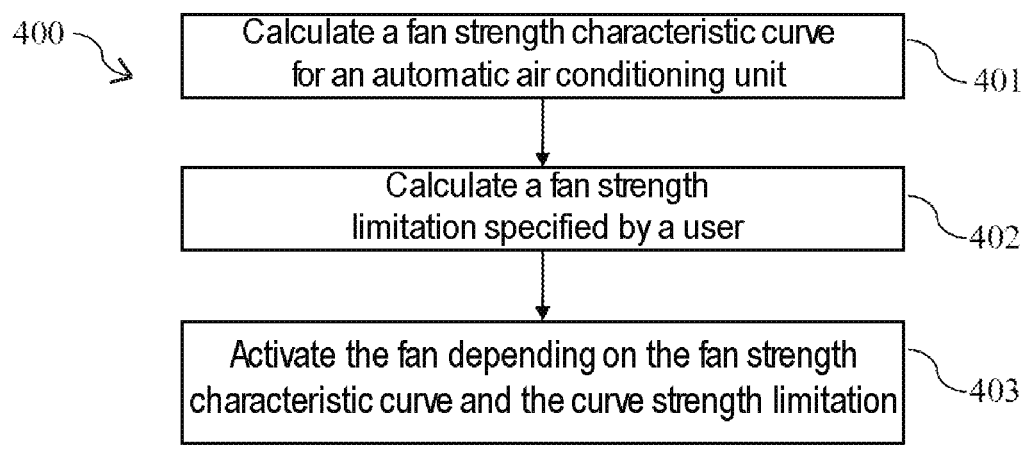
FIG. 4 represents a flow diagram of an exemplary method for controlling a fan of a vehicle.

FIG. 4 represents a flow diagram of an exemplary method 400 for controlling a fan 104 of an air conditioning system of a vehicle 100. The air conditioning system thereby includes automatic climate control. As part of the automatic climate control, one or more climate parameters (e.g. a temperature) may each be adjusted to a target value (specified by a user). In particular, a temperature in an interior of vehicle 100 may then be adjusted to a target temperature automatically.

Method 400 may include the calculation 401 of a fan characteristic curve 211, 212, 213 for automatic climate control. Fan characteristic curve 211, 212, 213 may be stored for example in a storage unit 103 of vehicle 100. Fan characteristic curve 211, 212, 213 may have been defined during a design phase of the air conditioning system and stored in storage unit 103 of vehicle 100 for example. The calculation 401 of fan characteristic curve 211, 212, 213 may then include accessing storage unit 103 to read-out the fan characteristic curve 211, 212, 213.

Fan characteristic curve 211, 212, 213 typically displays a fan strength 201 for fan 104 as a function of a control deviation 202 of the automatic climate control. Fan characteristic curve 211, 212, 213 may enable a fan strength 201 (particularly a fan stage) to be calculated as part of the automatic climate control, with which fan 104 of vehicle 100 is to be operated in order to adjust a climate parameter to a target value. In this context, fan characteristic curve 211, 212, 213 is typically configured such that fan strengths 201 displayed by fan characteristic curve 211, 212, 213 increase as the magnitude or absolute value of control deviation 202 increases, wherein control deviation 202 typically displays the deviation of the one or more climate parameters from the respective target value. This makes it possible for the one or more climate parameters to be adjusted reliably.

Method 400 further includes the calculation 402 of a fan strength limitation 203, 204 specified by a user, wherein fan strength limitation 203, 204 particularly includes a maximum fan strength 203 and/or a minimum fan strength 204. In this context, fan strength limitation 203, 204 may have been specified explicitly by a user via a user interface 105 of the air conditioning system (in particular independently of the specification of a fan characteristic curve 211, 212, 213).

Method 400 further includes the control 403 of fan 104 for automatic climate control depending on fan characteristic curve 211, 212, 213 and depending on fan strength limitation 203, 204. In particular, fan strength 201 of fan 104 may be determined on the basis of fan characteristic curve 211, 212, 213 and on the basis of a current control deviation 202. In this case, however, the upper and/or lower boundary of fan strength 201 may be set according to the fan strength limitation 203, 204 specified by the user.

The measures described in this document enable a user-specific limitation of the noise burden created by a fan 104 when automatic climate control is used at the same time in a vehicle 100. In particular, it makes it possible for a user to set a manual limit 203, 204 for fan strength 201, and thus to define the user-specific acoustic requirements within the automation program for an air conditioning system. In this way, it is possible even for a user who is sensitive to noise to benefit from the advantages of an automatic air conditioning unit. In this way, the comfort of the user of a vehicle 100 may be enhanced.

The foregoing disclosure has been set forth merely to illustrate the invention and is not intended to be limiting.

Since modifications of the disclosed embodiments incorporating the spirit and substance of the invention may occur to persons skilled in the art, the invention should be construed to include everything within the scope of the appended claims and equivalents thereof.

What is claimed is:

1. A vehicle air conditioning system having an automatic climate control, comprising:
    a user interface configured to simultaneously display all possible fan strengths of a fan of the air conditioning system on a screen of the user interface, and through which a maximum allowable fan strength during automatic operation of the fan and a minimum allowable fan strength during the automatic operation of the fan are adjustable by a user as a fan strength limitation for the fan of the air conditioning system from all of the possible fan strengths of the fan; and
    a processor of the air conditioning system having the automatic climate control, wherein the processor is programmed to execute a process to:
        determine the fan strength limitation specified by the user of the system; and
        activate the fan of the air conditioning system for the automatic climate control depending on a fan characteristic curve and depending on the fan strength limitation, such that a range of usable fan strengths during the automatic operation of the fan is limited by the fan strength limitation instead of all possible fan strengths,
    wherein a fan strength for the fan of the air conditioning system is controlled as a function of a control deviation value of the automatic climate control, the control deviation value indicating a degree to which a climate parameter differs from a target value, to adjust the climate parameter to the target value.

2. The air conditioning system according to claim 1, wherein
    the fan strength limitation comprises a maximum fan strength, and
    the processor is programmed to further execute a process to limit the fan strength for the fan that is used for the automatic climate control to the maximum fan strength.

3. The air conditioning system according to claim 1, wherein the processor is programmed to further execute a process to:
    calculate a current control deviation value of the automatic climate control;
    calculate a provisional fan strength based on the fan characteristic curve and based on the current control deviation value; and
    calculate a final fan strength for the fan during automatic climate control based on the provisional fan strength and based on the fan strength limitation.

4. The air conditioning system according to claim 3, wherein
    the fan strength limitation comprises a maximum fan strength,
    the processor is programmed to further execute a process to:
        compare the maximum fan strength with the provisional fan strength; and
        calculate the final fan strength depending on a result of the comparison.

5. The air conditioning system according to claim 4, wherein
    the final fan strength corresponds to the maximum fan strength if the provisional fan strength is greater than the maximum fan strength.

6. The air conditioning system according to claim 1, wherein the processor is further programmed to execute a process to:
    capture an input for specifying a value for a maximum fan strength and/or for a minimum fan strength entered by the user via a user interface of the air conditioning system.

7. The air conditioning system according to claim 1, wherein the con processor is further programmed to execute a process to:
    capture an input for specifying a fan characteristic curve entered by the user via a user interface of the air conditioning system.

8. The air conditioning system according to claim 1, wherein the processor is further programmed, as part of the automatic climate control, to execute a process to:
    calculate information relating to an actual temperature in an interior of the vehicle via a climate sensor of the air conditioning system;
    calculate information relating to a target temperature in the interior of the vehicle; and
    calculate a current control deviation value for the automatic climate control based on the information relating to the actual temperature and based on the information relating to the target temperature.

9. The air conditioning system according to claim 1, wherein
    the fan characteristic curve has a profile such that the fan strength increases as an absolute value of the control deviation value increases.

10. A method of controlling a fan of a vehicle air conditioning system having automatic climate control, the method comprising the acts of:
    simultaneously displaying all possible fan strengths of a fan of the air conditioning system on a screen of a user interface;
    determining a fan strength limitation, including a maximum allowable fan strength during automatic operation of the fan and a minimum allowable fan strength during the automatic operation of the fan, input by a user of the air conditioning system via the user interface through which the user adjusts the fan strength limitation for the fan of the air conditioning system from all of the possible fan strengths of the fan; and
    controlling the fan for the automatic climate control depending on a fan characteristic curve and depending on the fan strength limitation, such that a range of usable fan strengths during the automatic operation of the fan is limited by the fan strength limitation instead of all possible fan strengths;
    wherein a fan strength for the fan is controlled as a function of a control deviation value of the automatic climate control, the control deviation value indicating a degree to which a climate parameter differs from a target value, to adjust the climate parameter to the target value.

* * * * *